(12) United States Patent
Taskiran et al.

(10) Patent No.: US 8,848,745 B2
(45) Date of Patent: Sep. 30, 2014

(54) REMOTE FLASH ACCESS

(75) Inventors: Pinar Taskiran, Doraville, GA (US);
Karthik Balasubramanian, Suwanee, GA (US); Jean Cyr, Cumming, GA (US)

(73) Assignee: Broadcom Corporation, Irvine, CA (US)

( * ) Notice: Subject to any disclaimer, the term of this patent is extended or adjusted under 35 U.S.C. 154(b) by 1613 days.

(21) Appl. No.: 11/840,058

(22) Filed: Aug. 16, 2007

(65) Prior Publication Data

US 2008/0043781 A1    Feb. 21, 2008

Related U.S. Application Data

(60) Provisional application No. 60/838,136, filed on Aug. 17, 2006.

(51) Int. Cl.
*H04J 3/06* (2006.01)

(52) U.S. Cl.
USPC ............. 370/509; 370/252; 725/68; 725/111; 725/118

(58) Field of Classification Search
USPC ...................... 370/509; 725/22, 132; 709/213
See application file for complete search history.

(56) References Cited

U.S. PATENT DOCUMENTS

| | | | | |
|---|---|---|---|---|
| 5,930,515 A | * | 7/1999 | Ducharme et al. | 717/169 |
| 6,157,965 A | * | 12/2000 | Mohammed et al. | 710/8 |
| 7,174,512 B2 | * | 2/2007 | Martin et al. | 715/719 |
| 2001/0012446 A1 | * | 8/2001 | Kizu et al. | 386/125 |
| 2002/0088007 A1 | * | 7/2002 | Shimoji et al. | 725/135 |
| 2004/0034736 A1 | * | 2/2004 | Horn | 711/114 |
| 2005/0220126 A1 | * | 10/2005 | Gervais et al. | 370/401 |
| 2006/0215562 A1 | * | 9/2006 | Mou | 370/235 |

OTHER PUBLICATIONS http://www.bowe.id.au/michael/isp/DOCSIS/collected-references/M-CMTS-Tutorial-Public-070220a.pdf "Modular CMTS Tutorial"—Oct. 2005 Cisco.*

* cited by examiner

*Primary Examiner* — Randy Scott
(74) *Attorney, Agent, or Firm* — Sterne Kessler Goldstein & Fox PLLC (57) ABSTRACT

A system, method, and computer program product for allowing a first processor to access flash or other non-volatile memory that is associated with a second processor. The first processor obtains parameters that allow the initialization of an internet protocol (IP) stack. The parameters can be obtained using the trivial file transfer protocol (TFTP), for example. The first processor communicates with the second processor using a socket protocol, sending a command word that represents either a read or write command. The command word specifies where in the non-volatile memory the access is to occur, and for how many bytes. Information is then returned to the first processor, allowing the first processor to verify the success of the access.

19 Claims, 6 Drawing Sheets

REMOTE FLASH ACCESS

This application claims the benefit of U.S. Provisional Application 60/838,136, filed on Aug. 17, 2006, which is incorporated herein by reference in its entirety.

BACKGROUND OF THE INVENTION

1. Field of the Invention

The invention described herein relates to memory access, and more particularly relates to remotely accessing non-volatile memory.

2. Background Art

A modern processor typically requires some amount of non-volatile memory, such as flash memory, in order to store instructions or data. More non-volatile memory allows for more flexible designs and greater utility, in that greater amounts of data can be stored and accessed. Moreover, it is common for processor-based systems or components to make use of multiple processors. Ideally each processor would have its own non-volatile memory for its own purposes.

There may be design constraints, however, that limit the amount of memory that can be implemented. Such constraints may include limitations of physical space or limitations of cost. For these and other reasons, it may not be practical to allocate or otherwise provide for non-volatile memory for each processor. There is a need, therefore, for a system and method by which multiple processors can share a single non-volatile memory, such that a processor may remotely access the non-volatile memory of another processor.

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Conventional cable modem systems utilize DOCSIS (Data Over Cable System Interface Specification)—compliant equipment and protocols to transfer data between one or more cable modems (CM) and a cable modem termination system (CMTS). DOCSIS generally refers to a group of specifications that define industry standards for cable headend and cable modem equipment. In part, DOCSIS sets forth requirements and objectives for various aspects of cable modem systems including operations support systems, management, data interfaces, as well as network layer, data link layer, and physical layer transport for cable modem systems.

Figure 1:
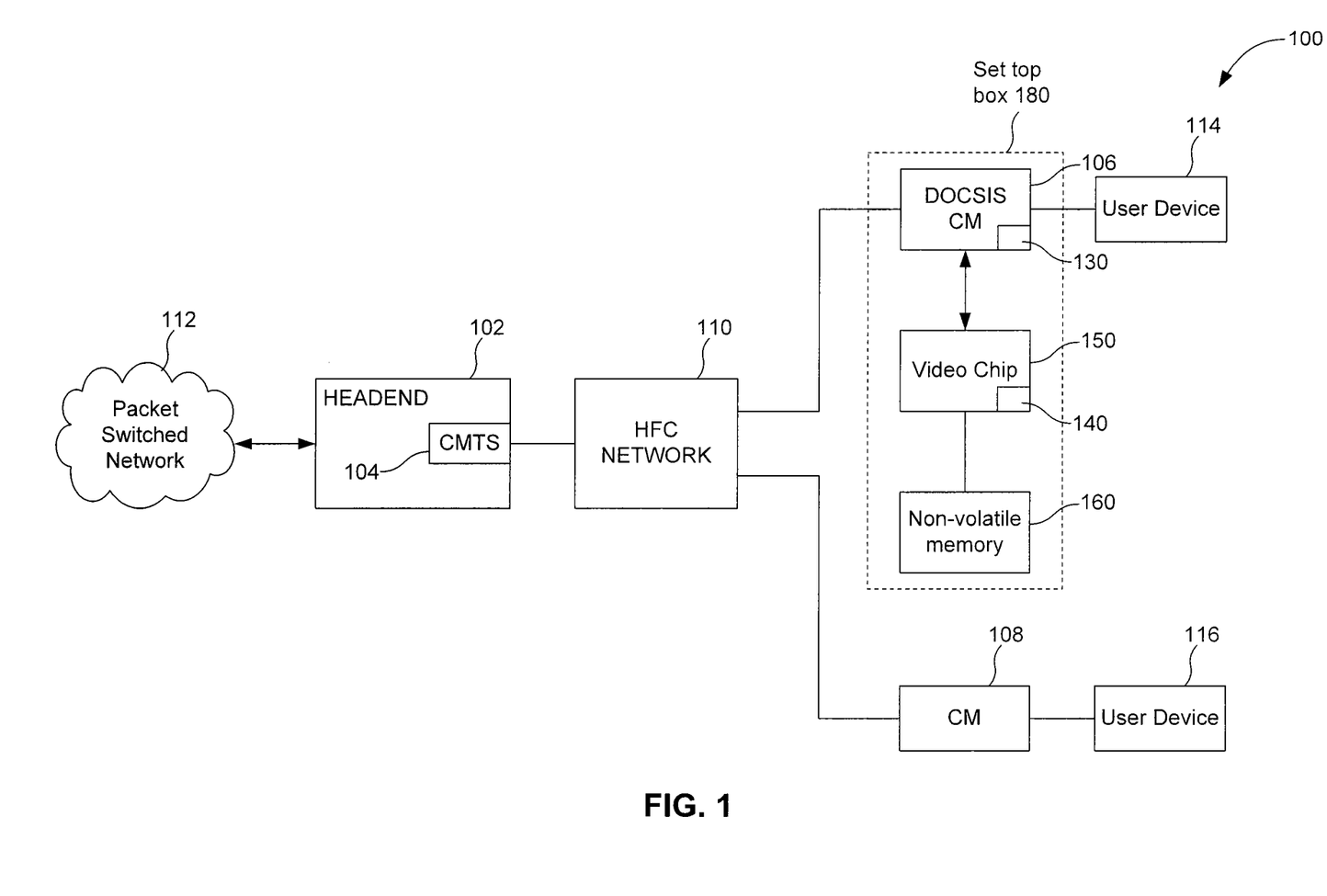
FIG. 1 is a block diagram illustrating the system context of an embodiment of the invention.

FIG. 1 is a high level block diagram of an example cable modem system 100 in accordance with embodiments of the present invention. The cable modem system 100 enables voice communications, video and data services based on a bi-directional transfer of packet-based traffic, such as Internet protocol (IP) traffic, between a cable system headend 102 and a plurality of cable modems over a hybrid fiber-coaxial (HFC) cable network 110. In the example cable modem system 100, only two cable modems 106 and 108 are shown for clarity. In general, any number of cable modems may be included in the cable modem system of the present invention. The cable headend 102 is comprised of at least one cable modem termination system (CMTS) 104. The CMTS 104 is the portion of the cable headend 102 that manages the upstream and downstream transfer of data between the cable headend 102 and the cable modems 106 and 108, which are located at the customer premises. The CMTS 104 broadcasts information downstream to the cable modems 106 and 108 as a continuous transmitted signal in accordance with a time division multiplexing (TDM) technique. Additionally, the CMTS 104 controls the upstream transmission of data from the cable modems 106 and 108 to itself by assigning to each cable modem 106 and 108 short grants of time within which to transfer data. In accordance with this time domain multiple access (TDMA) technique, each cable modem 106 and 108 may only send information upstream as short burst signals during a transmission opportunity allocated to it by the CMTS 104.

As shown in FIG. 1, the CMTS 102 further serves as an interface between the HFC network 110 and a packet-switched network 112, transferring IP packets received from the cable modems 106 and 108 to the packet-switched network 112 and transferring IP packets received from the packet-switched network 112 to the cable modems 106 and 108 when appropriate. In embodiments, the packet-switched network 112 comprises the Internet.

In addition to the CMTS 104, the cable headend 102 may also include one or more Internet routers to facilitate the connection between the CMTS 104 and the packet-switched network 112, as well as one or more servers for performing necessary network management tasks.

The HFC network 110 provides a point-to-multipoint topology for the high-speed, reliable, and secure transport of data between the cable headend 102 and the cable modems 106 and 108 at the customer premises. As will be appreciated by persons skilled in the relevant art(s), the HFC network 110 may comprise coaxial cable, fiberoptic cable, or a combination of coaxial cable and fiberoptic cable linked via one or more fiber nodes. Each of the cable modems 106 and 108 operates as an interface between the HFC network 110 and at least one attached user device. In particular, the cable modems 106 and 108 perform the functions necessary to convert downstream signals received over the HFC network 110 into IP data packets for receipt by an attached user device. Additionally, the cable modems 106 and 108 perform the functions necessary to convert IP data packets received from the attached user device into upstream burst signals suitable for transfer over the HFC network 110. In the example cable modem system 100, each cable modem 106 and 108 is shown supporting only a single user device for clarity. In general, each cable modem 106 and 108 is capable of supporting a plurality of user devices for communication over the cable modem system 100. User devices may include personal computers, data terminal equipment, telephony devices, broadband media players, network-controlled appliances, or any other device capable of transmitting or receiving data over a packet-switched network.

Referring to FIG. 1, the cable modem 106 can be located in a larger device, such as set-top box 180. The cable modem 106 executes a DOCSIS application thereby making it DOCSIS-compliant. Cable modem 106 contains a cable modem processor 130. The set-top box 180 also includes a video chip 150 that is directly connected to non-volatile memory 160. Video chip 150 contains a video chip processor 140. The DOCSIS-compliant cable modem 106 requires non-volatile storage of many parameters. Accordingly, the cable modem 106 may either have a local non-volatile memory for this purpose or it may indirectly use non-volatile memory 160 (such as flash memory) controlled by a video processing chip 150.

The invention includes a remote non-volatile memory access method for the multi-processor system shown in FIG. 1. Note that the discussion herein refers to non-volatile memory and flash memory interchangeably. While the discussion sometimes refers to flash memory specifically, it is to be understood that the description herein applies equally to any form of non-volatile memory.

The cable modem 106 can communicate with video processing chip 150 via, for example, a PCI bus and/or universal serial bus, such as a bus conforming to the USB 2.0 standard. The cable modem 106 and video processing chip 150 can alternatively communicate using other mechanisms, as is known to persons of ordinary skill in the art. The cable modem 106 and video processing chip 108 both have processors, as noted above. For portability, the inter-processor communication protocol may be independent of the medium; therefore, it can be practical to convey the remote flash accesses using an IP-based protocol. However, there are several DOCSIS parameters that must be read from the non-volatile memory before IP communications are initialized.

When the DOCSIS application running on the cable modem 106 is initialized it reads the non-volatile parameters and stores them in local RAM. During operation, when DOCSIS wants to write a non-volatile value, it saves it in local RAM and periodically writes these values in RAM to non-volatile memory.

Figure 2:
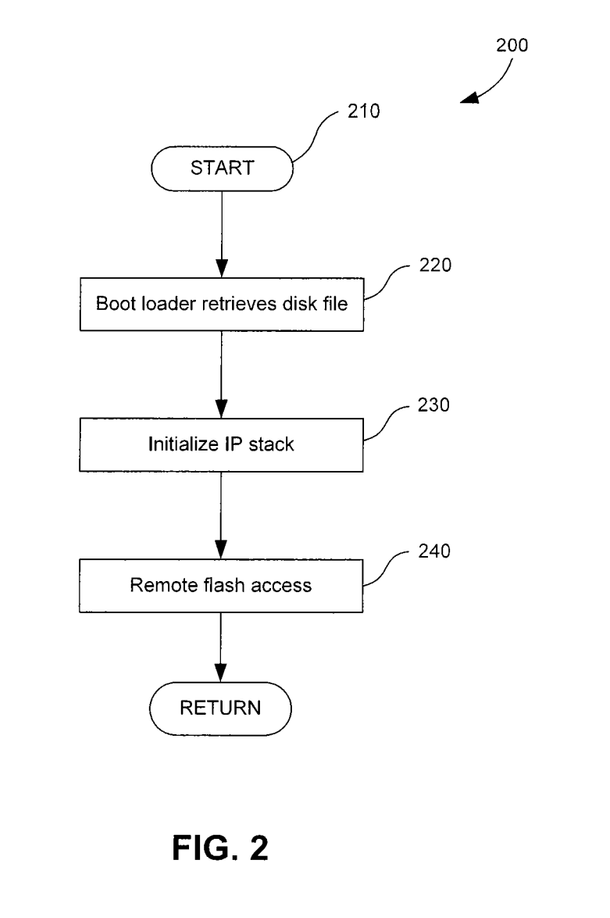
FIG. 2 is a flowchart illustrating the overall processing of an embodiment of the invention.

An embodiment of the overall processing of the invention is illustrated in FIG. 2. The process begins at step 210. At step 220, a boot loader retrieves one or more disk files from non-volatile memory 160. This retrieval can be performed, in an embodiment of the invention, using the trivial file transfer protocol (TFTP). Via TFTP, the boot loader retrieves disk files that store non-volatile parameters and loads these parameters to a pre-determined location in RAM. In alternative embodiments of the invention, this retrieval step can be performed using any of the methods known in the art, including, but not limited to, bulk DMA. Examples of such parameters include indications of the CM interfaces enabled, and of MAC addresses. In step 230, the retrieved parameters are used to initialize the internet protocol (IP) stack(s). Once the IP stack initialization is done, the remote flash access can be performed in step 240. The process concludes at step 250.

In an embodiment of the invention, the cable modem 106 uses a socket protocol to access the non-volatile parameters on the video processing chip 150. In an embodiment of the invention, this software includes two components:
 a. The client side of this software is implemented on the cable modem chip side and is transparent to the DOCSIS application. It is a flash device driver to DOCSIS application.
 b. The server side of this software is a standalone application that runs on the video processing chip 150. To keep the server side generic, the intelligence of the software is kept on client side (at the cable modem 106).

Figure 3A:
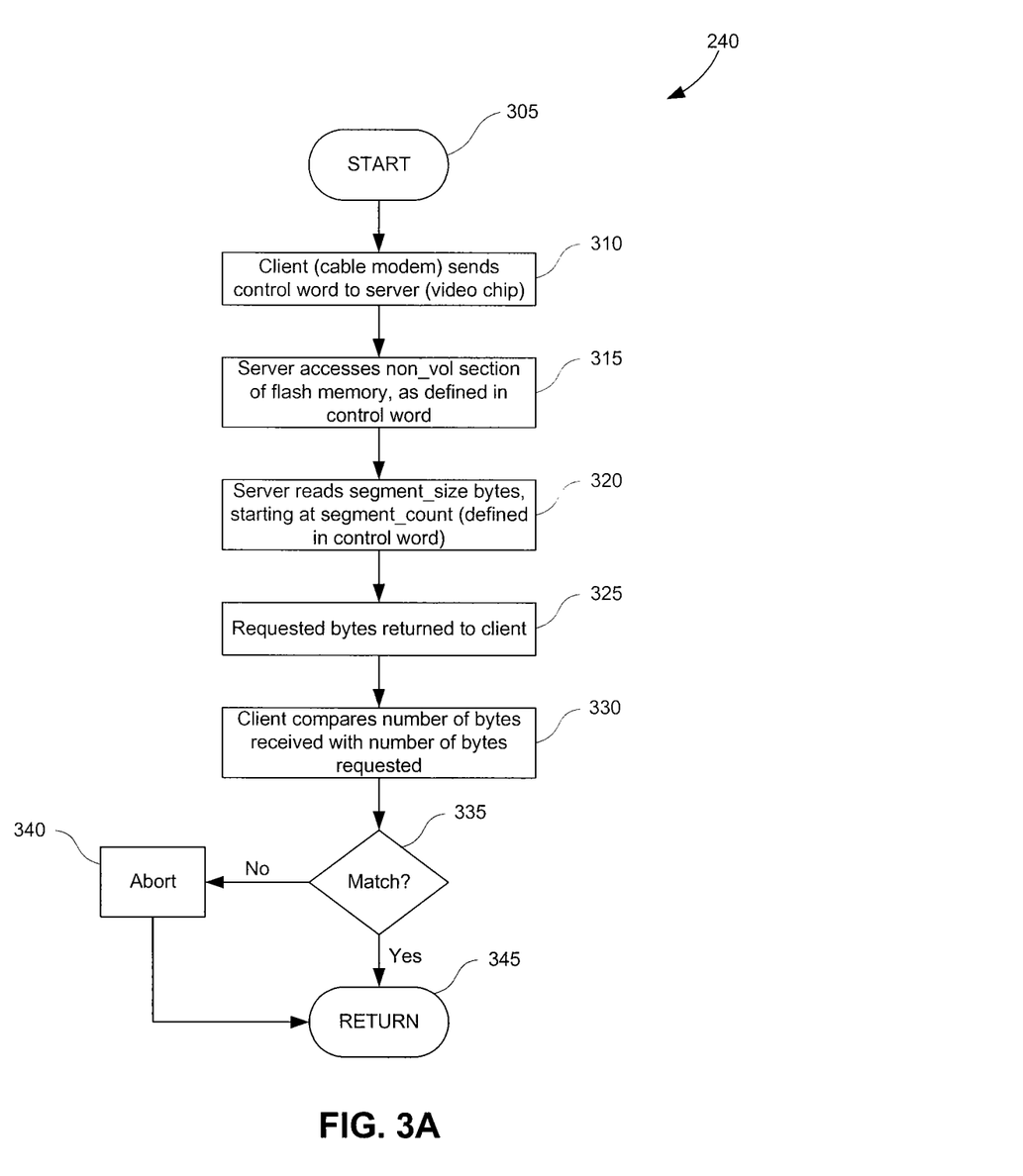
FIG. 3A is a flowchart illustrating the remote access of a flash memory for purposes of reading from the memory, according to an embodiment of the invention.
Figure 3B:
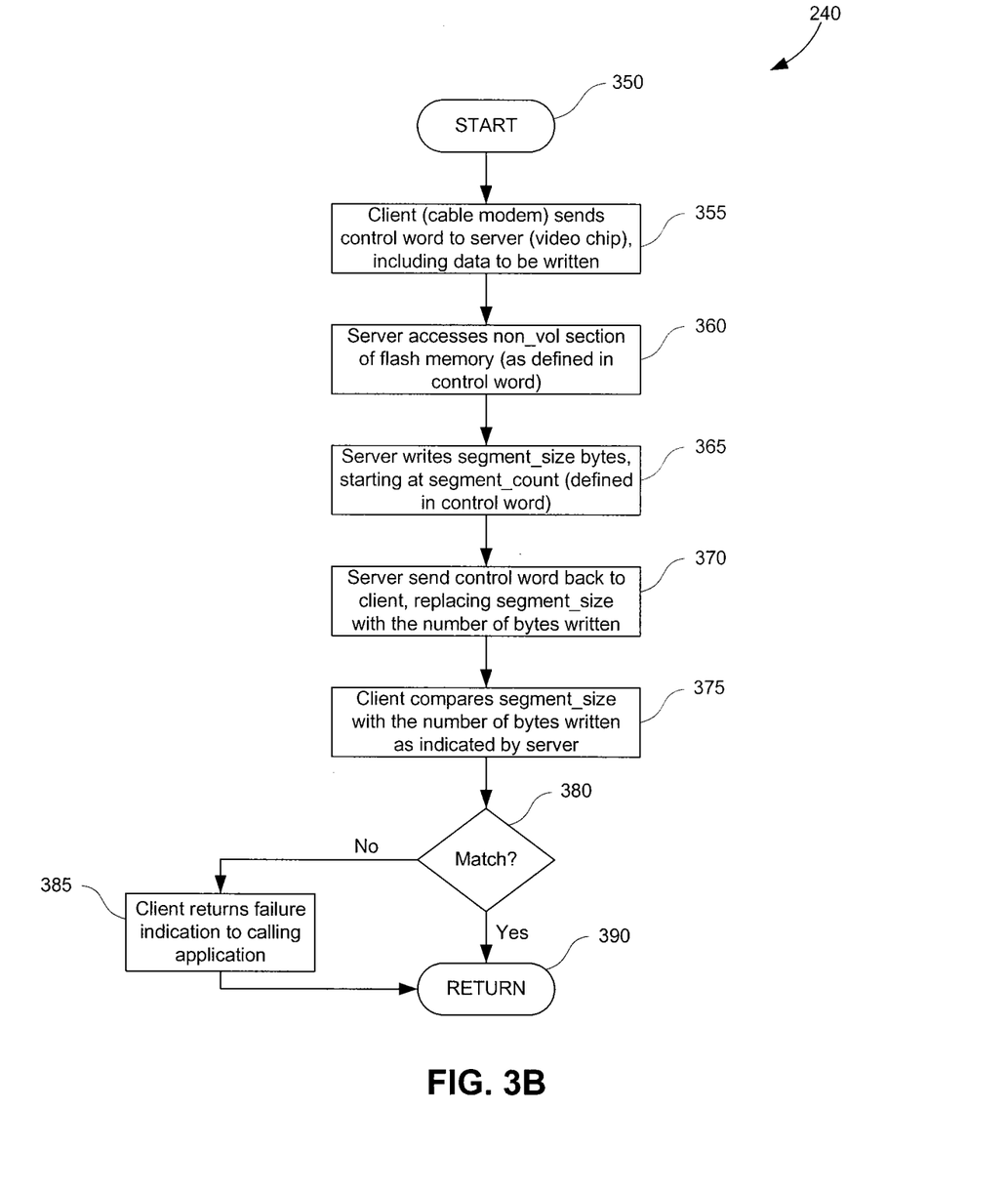
FIG. 3B is a flowchart illustrating the remote access of a flash memory for purposes of writing to the memory, according to an embodiment of the invention.

The remote flash access 240 is illustrated in greater detail in FIGS. 3A and 3B, according to an embodiment of the invention. FIG. 3A illustrates the remote access of flash memory for purposes of reading data from that flash memory. FIG. 3B illustrates the process of remotely writing to the flash memory.

The read process begins in FIG. 3A at step 305. In step 310, a client process at the cable modem sends a control word to a server process running at the video chip. The control word is sent via a socket protocol. The structure of the control word will be discussed in greater detail below with respect to FIG. 4. In step 315, the server accesses a section of the non-volatile flash memory defined by the parameter nonvol_section. This parameter is provided to the server in the control word.

In step 320, the server reads a number of bytes in this section of the flash memory. The specific bytes to be read in this section of flash memory are defined by two additional parameters provided in the control word. The first is segment_count. This represents an offset value within the section nonvol_section. The number of bytes to be read, starting at this point, is defined by the second parameter, segment_size. Considering steps 315 and 320 in aggregate, therefore, the server will go to the section nonvol_section, advance to an offset defined by segment_count, then read a number of bytes defined by the value segment_size. In step 325, the requested bytes of data are returned to the client via the socket protocol.

In order to verify the success of the read operation in the illustrated embodiment, in step 330 the client compares the number of bytes received in step 325 with the number of bytes originally requested in the control word. In step 335, the determination is made as to whether these two values match. If not, then the process continues to step 340, where the read process is aborted. If the values match, then the process concludes at step 345.

The process of remotely writing to flash memory according to an embodiment of the invention is illustrated in FIG. 3B. The process begins at step 350. In step 355, the client process at the cable modem sends a control word, via the socket protocol, to the server process that is running at the video chip. In addition to the control word, the client also sends the data to be written. In step 360, the server access the section of the flash memory to which the data is to be written. As in the case of the read process of FIG. 3A, the section of memory to be accessed is identified by the parameter nonvol_section which is contained in the control word. In step 365, the server writes the data beginning at an offset within the section nonvol_section of the flash memory. This offset is known as segment_count and is defined in the control word. The number of bytes to be written is also specified in the control word, using the parameter segment_size.

In step 370, the server, after writing the data, sends a modified version of the control word back to the client process via the socket protocol. The modification consists of replacing the parameter segment_size with a value indicating the number of bytes actually written to memory.

In step 375 the client compares the parameter segment_size as originally contained in the control word sent to the server, with the number of bytes actually written as indicated by the server in step 370. In step 380, a determination is made as to whether these values match. If not, then in step 385 the client returns a failure indication to the application that called the write process. If these values match, as determined in step 380, then the process concludes at step 390.

Figure 4:
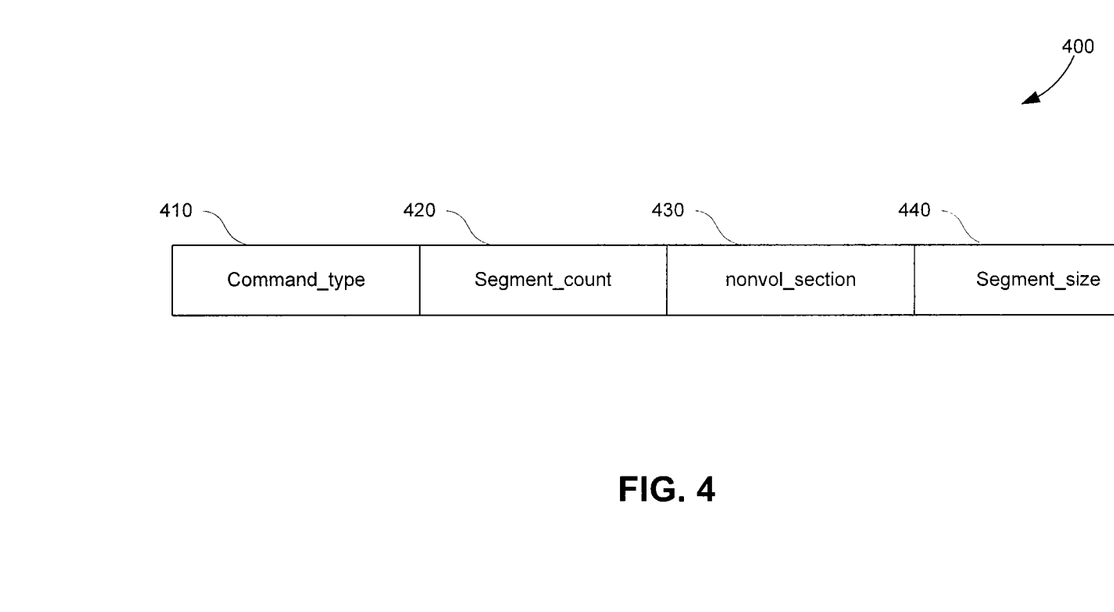
FIG. 4 illustrates a control word used to remotely access non-volatile memory, according to an embodiment of the invention.

FIG. 4 illustrates a control word 400, according to an embodiment of the invention. The control word 400 comprises four fields. Field 410 contains the parameter command_type. This field indicates the type of command, i.e., whether the control word 400 represents a read request or a write request. Field 420 contains the parameter segment_count. This parameter indicates the offset within the section of flash memory to be accessed. Access to the flash memory will therefore begin in the specified section (indicated in field 430, to be described below) at an offset defined by the parameter segment_count.

Field 430 defines the section in flash memory that is to be accessed. This section is identified by the parameter nonvol_section. Field 440 contains a parameter that indicates the size of the segment in flash memory that will be accessed. This size value is indicated by the parameter segment_size. This parameter therefore represents the amount of data to be written in the event of a write command. In the case of a read command, this parameter refers to the amount of data to be read. In an embodiment of the invention, control word 400 is eight bytes long.

In the case of a write operation, this command word is followed by the number of 'segment_size' bytes of data. Server acknowledges the request by sending the same control word back except for the segment_size, which the server replaces with the number of bytes it writes to the specified non-volatile section. If the segment_size or the segment_count value does not match what client expects then the client returns failure to DOCSIS application.

The same rule applies to read operation. If the client does not receive the number of bytes it expects it aborts the operation. If the client does not receive a response from the server then it will timeout and declare failure to DOCSIS application.

Figure 5:
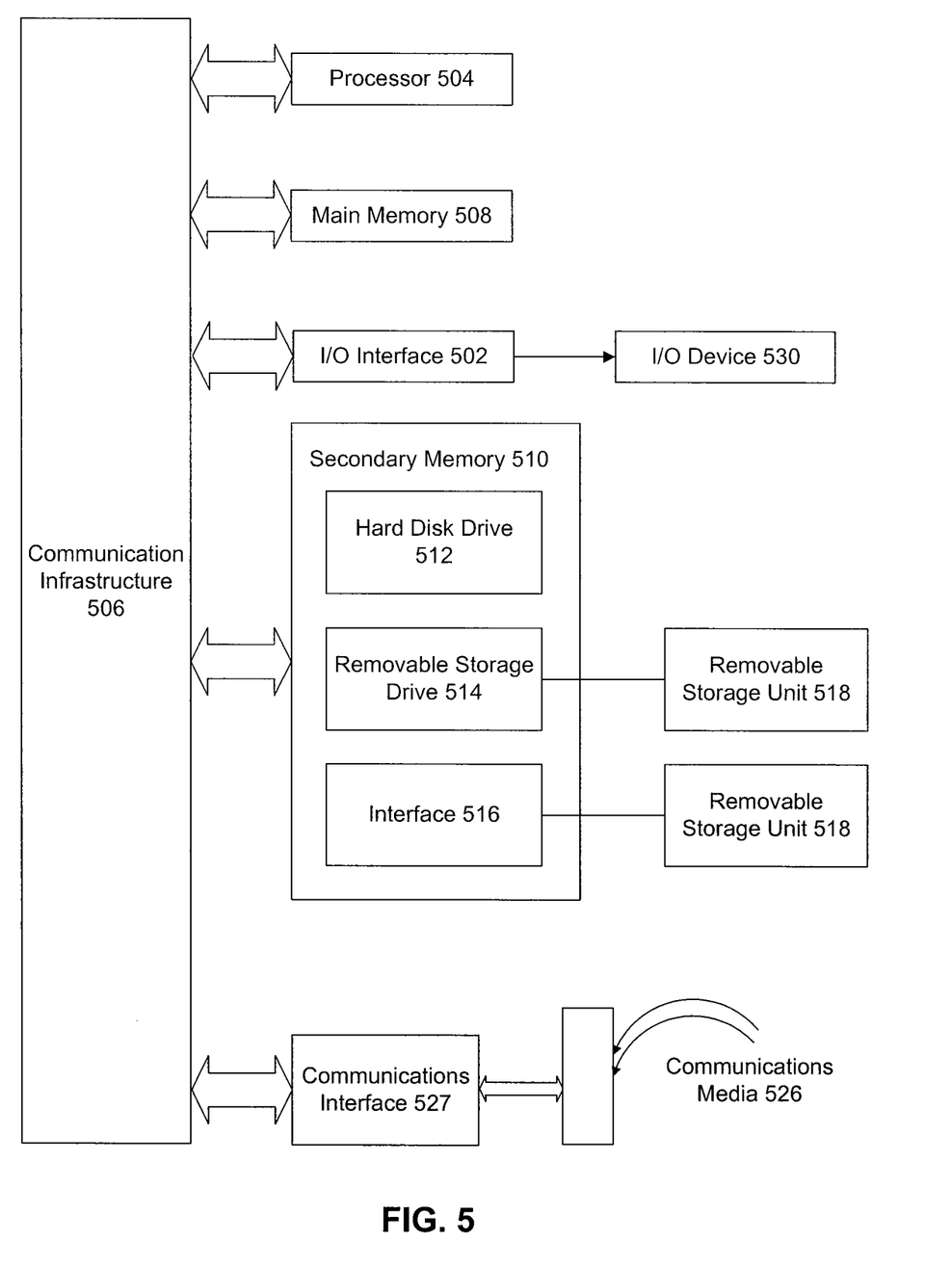
FIG. 5 is a block diagram illustrating the computing context of an embodiment of the invention.

FIG. 5 illustrates the general computing context of the invention. This figure is an abstract portrayal of a computer system 500. This can represent the computing system surrounding the processor 130 of cable modem 106 in FIG. 1. This system can also represent the computing system surrounding the processor 140 of video processing chip 150.

The computer system 500 includes one or more processors (also called central processing units, or CPUs), such as a processor 504. In cable modem 106 of FIG. 1, cable modem processor 130 corresponds to processor 504 of FIG. 5. In video processing chip 150, video chip processor 140 corresponds to processor 504 of FIG. 5. The processor 504 is connected to a communication bus 506. The computer 500 also includes a main or primary memory 508, such as random access memory (RAM). The primary memory 508 has stored therein control logic (computer software), and data. In the case of cable modem 106, primary memory 508 represents a cable modem memory for storing control logic. In the case of video chip 150, primary memory 508 represents a video chip memory for storing control logic.

The computer 500 can also include one or more secondary storage devices 510. The secondary storage devices 510 include, for example, a hard disk drive 512 and/or a removable storage device or drive 514. The removable storage drive 514 can represent a compact disk drive or other optical storage device, for example.

Any removable storage drive 514 interacts with a removable storage unit 518. The removable storage unit 518 includes a computer useable or readable storage medium having stored therein computer software (control logic) and/or data. Removable storage unit 518 can represent any computer data storage device. The removable storage drive 514 reads from and/or writes to the removable storage unit 518 in a well known manner.

The computer system 500 may also include one or more input/output devices 530.

The computer 500 further includes one or more communication or network interfaces 527. The communications interface(s) 527 enables the computer 500 to communicate with remote devices. For example, the communications interface(s) 527 allows the computer 500 to communicate over communication networks or media 526 (representing a form of a computer useable or readable medium), such as a USB, PCI connection or other. In the case of a cable modem 106, an interface 527 can be used to transmit control words and data to be written to a remote non-volatile memory, and to receive control words and data read from the remote non-volatile memory. In the case of a video chip 150, an interface 527 can be used to receive control words and data to be written to non-volatile memory, and to send control words and data read from non-volatile memory.

Control logic may be transmitted to and from the computer 500 via one of the communications interfaces 527. In the case of set-top box 180, control logic may be conveyed to an interface 527 via HFC network 110.

Any apparatus or manufacture comprising a computer useable or readable medium having control logic (software) stored therein is referred to herein as a computer program product or program storage device. This includes, but is not limited to, the computer 500, the main memory 508, the hard disk 512, and the removable storage unit 518. Carrier waves received over an interface 527 can also be modulated with control logic. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
   sending, from a client implemented at a cable modem, a control word to a server at a video chip via a socket protocol over a peripheral interface, the control word specifying a starting point in a non-volatile memory and an amount of data, the data comprising cable modem configuration parameters;
   responsive to the control word representing a read request,
      receiving, at the client, the data from the server at the video chip via the socket protocol, and
      verifying that the amount of data received equals the amount of data specified in the control word; and
   responsive to the control word representing a write request,
      sending, to the server at the video chip, the data to be written,
      receiving, via the socket protocol, an indication of the amount of written data from the server at the video chip, and
      verifying that the amount of data sent equals the amount of written data.

2. The method of claim 1, wherein the control word comprises fields that indicate:
   a command type indicating whether the control word represents the read request or the write request;
   a section of the non-volatile memory that is to be accessed;
   a segment count indicating an offset in the section; and
   a segment size indicating the amount of data, beginning at the segment count in the section, to be read if the control word represents the read request, or to be written if the control word represents the write request.

3. The method of claim 1, wherein said non-volatile memory comprises a flash memory.

4. The method of claim 1, further comprising:
   aborting the read request if the amount of data received does not equal the amount of data specified in the control word.

5. The method of claim 1, further comprising:
   returning, from the client to a calling application, a failure indication if the indicated amount of data written does not equal the amount of data sent.

6. The method of claim 1, further comprising:
   retrieving one or more files from the non-volatile memory via a trivial file transfer protocol, the files containing the cable modem configuration parameters;
   storing the cable modem configuration parameters in memory that is local to the cable modem; and
   using the cable modem configuration parameters to initialize an Internet Protocol (IP) stack, wherein retrieving the one or more files, storing the cable modem configuration parameters, and using the cable modem configuration parameters are performed before sending the control word to the server.

7. The method of claim 1, wherein sending, from the client implemented at the cable modem, the control word to the server at the video chip comprises:
   sending, from a client software implemented at the cable modem, the control word to the server at the video chip.

8. A method, comprising:
   receiving, at a server at a video chip, a control word from a client implemented at a cable modem via a socket protocol over a peripheral interface, the control word specifying a starting point in a non-volatile memory and an indication of an amount of data to be read from or written to the non-volatile memory, the data comprising cable modem configuration parameters;
   responsive to the control word representing a read request,
      reading the data from the non-volatile memory beginning at the starting point, in an amount specified in the control word, and
      sending the data to the client via the socket protocol; and
   responsive to the control word representing a write request,
      receiving the data from the client via the socket protocol,
      writing the data in the non-volatile memory, beginning at the starting point specified in the control word, and
      sending, to the client via the socket protocol, an indication of the amount of data written.

9. The method of claim 8, wherein the control word comprises fields that indicate:
   a command type indicating whether the control word represents the read request or the write request;
   a section of the non-volatile memory that is to be accessed;
   a segment count indicating an offset in the section; and
   a segment size indicating the amount of data, beginning at the segment count in the section, to be read if the control word represents the read request, and to be written if the control word represents the write request.

10. The method of claim 8, wherein said non-volatile memory comprises a flash memory.

11. The method of claim 8, wherein receiving the control word from the client implemented at the cable modem comprises:
   receiving the control word from a client software implemented at the cable modem.

12. A set top box, comprising:
   a cable modem;
   a video chip in communication with said cable modem via a socket protocol; and
   a non-volatile memory in communication with said video chip;
   wherein said cable modem comprises:
      a cable modem processor; and
      a cable modem memory in communication with said cable modem processor, said cable modem memory for storing a plurality of processing instructions for directing said cable modem processor to:
         send, from a client implemented at the cable modem, a control word to a server at a video chip via a socket protocol over a peripheral interface, the control word specifying a starting point in the non-volatile memory and an amount of data, the data comprising cable modem configuration parameters, if the control word represents a read request,
receive, at the client, the data from the server via the socket protocol, and
verify that the amount of data received equals the amount of data specified in the control word, and if the control word represents a write request,
send, to the server at the video chip, the data to be written,
receive, via the socket protocol, an indication of the amount of written data, and
verify that the amount of data sent equals the amount of written data.

13. The set top box of claim 12, wherein said non-volatile memory comprises a flash memory.

14. The set top box of claim 12, wherein said video chip comprises:
a video chip processor; and
a video chip memory in communication with said video chip processor, said video chip memory for storing a plurality of process instructions for directing said video chip processor to
receive at the server at the video chip, the control word from the client implemented at the cable modem via the socket protocol,
if the control word represents a read request,
read the data from the non-volatile memory beginning at the starting point, in an amount specified in the control word, and
send the data to the client via the socket protocol, and
if the control word represents a write request,
receive the data from the client via the socket protocol,
write the data in the non-volatile memory, beginning at the starting point specified by the control word, and
send, to the client via the socket protocol, an indication of the amount of data written.

15. A non-transitory computer useable medium having stored therein computer-executable instructions that, if executed by a computing device, cause the computing device to perform operations comprising:
sending, from a client implemented at a cable modem, a control word to a server at a video chip via a socket protocol over a peripheral interface, the control word specifying a starting point in a non-volatile memory and an amount of data, the data comprising cable modem configuration parameters;
responsive to the control word representing a read request,
receiving, at the client, the data from the server at the video chip via the socket protocol, and
verifying that the amount of data received equals the amount of data specified in the control word; and
responsive to the control word representing a write request,
sending, to the server at the video chip, the data to be written,
receiving, via the socket protocol, an indication of the amount of written data from the server at the video chip, and
verifying that the amount of data sent equals the amount of written data.

16. The computer usable medium of claim 15, the operations further comprising:
if the control word represents a read request, aborting the read request if an amount of read data does not equal the amount of data specified in the control word.

17. The computer usable medium of claim 15, the operations further comprising:
if the control word represents a write request, returning a failure indication to a calling application if the indicated amount of data written does not equal the amount of data sent.

18. The computer usable medium of claim 15, the operations further comprising:
retrieving files from the non-volatile memory via a trivial file transfer protocol, the files containing the cable modem configuration parameters;
storing the cable modem configuration parameters in memory that is local to the cable modem; and
using the cable modem configuration parameters to initialize an Internet Protocol (IP) stack.

19. A non-transitory computer useable medium having stored therein computer-executable instructions that, if executed by a computing device, cause the computing device to perform operations comprising:
receiving at a server at a video chip, a control word from a client implemented at a cable modem via a socket protocol over a peripheral interface, the control word specifying a starting point in a non-volatile memory and an indication of an amount of data to be read from or written to the non-volatile memory, the data comprising cable modem configuration parameters;
responsive to the control word representing a read request,
reading the data from the non-volatile memory beginning at the starting point, in an amount specified in the control word, and
sending the data to the client via the socket protocol; and
responsive to the control word representing a write request,
receiving the data from the client via the socket protocol,
writing the data in the non-volatile memory, beginning at the starting point specified by the control word, and
sending to the client via the socket protocol, an indication of the amount of data written.

* * * * *